Aug. 10, 1926.
B. H. GERKER
SPARE TIRE PROTECTOR
Filed Oct. 9, 1925 2 Sheets-Sheet 1
1,595,974
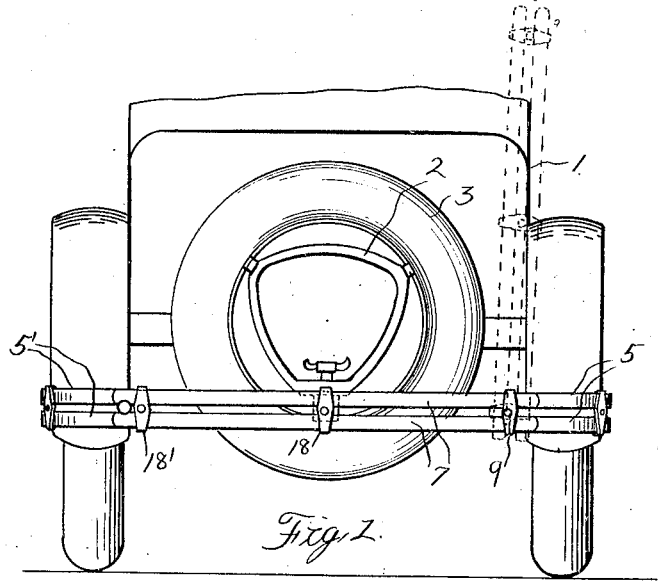
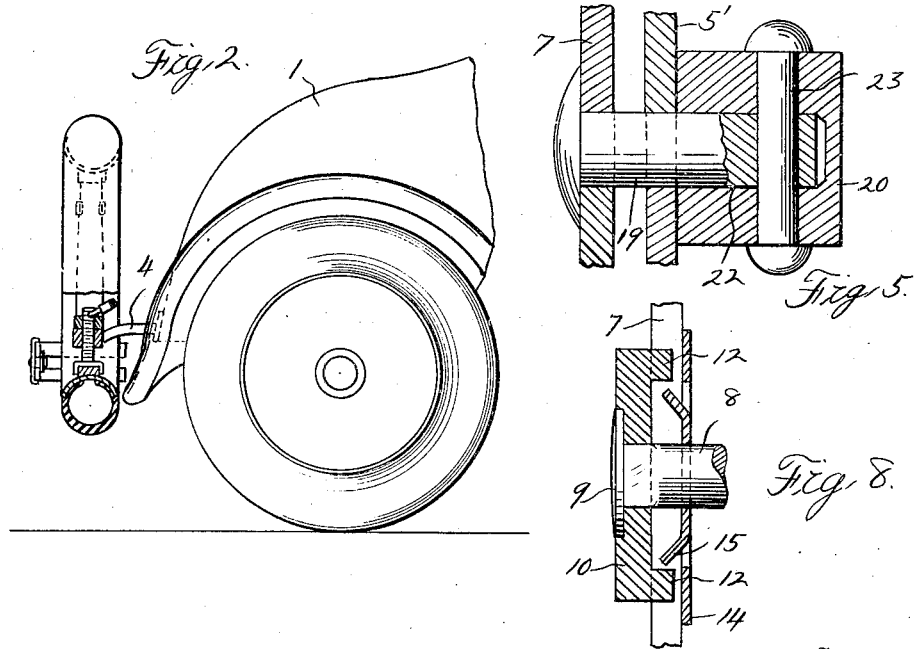
Inventor
Bernard H. Gerker
By J. S. Murray
Attorney Aug. 10, 1926.    1,595,974
B. H. GERKER
SPARE TIRE PROTECTOR
Filed Oct. 9, 1925    2 Sheets-Sheet 2
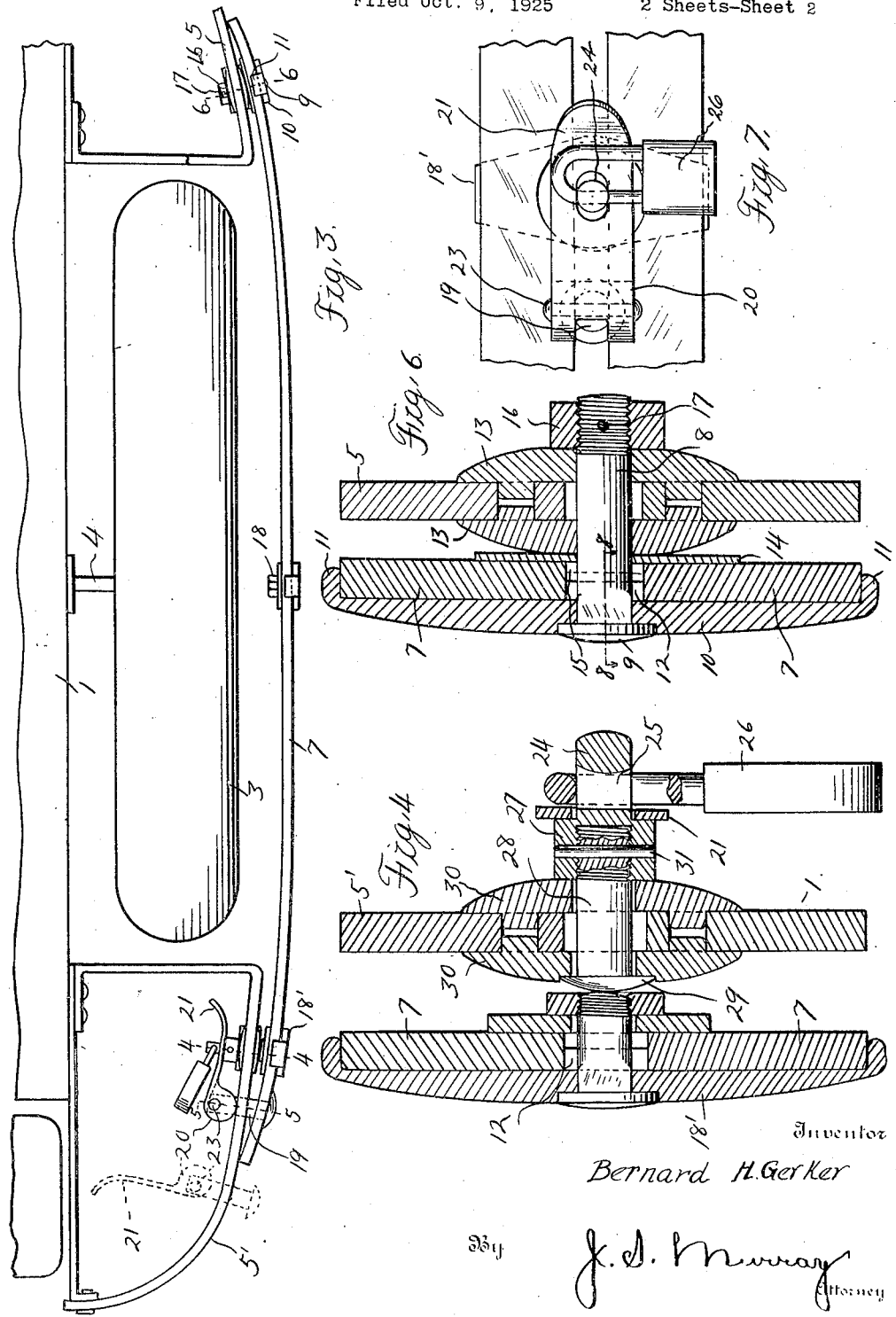

Patented Aug. 10, 1926.

1,595,974

UNITED STATES PATENT OFFICE.

BERNARD H. GERKER, OF DETROIT, MICHIGAN.

SPARE-TIRE PROTECTOR.

Application filed October 9, 1925. Serial No. 61,436.

This invention relates to spare tire protectors, and relates particularly to devices associated with the spare tire carriers of motor vehicles to protect the tires on said carriers.

It is an object of the invention to mount a guard bar in such relation to a spare tire carrier as to not only prevent theft of a tire upon said carrier, but to further safeguard the tire and its carrier against damage in the event of collision.

Another object is to mount a guard bar pivotally at one side of a tire carrier and to make provision for locking said bar to the vehicle at the other side of the carrier, the bar being adjustable about its pivotal end, upon release of its other end, to permit removal of the spare tire.

Still another object is to provide a novel adjustable mounting for a guard bar upon the rear fender guards of a motor vehicle, and to provide for normally locking said bar to one of said guards to prevent unauthorized removal of a tire from the vehicle.

A still further object is to associate with a guard bar for a spare tire means for firmly clamping said bar to a supporting portion of a vehicle so as to eliminate any possibility of rattle, and to provide for locking said bar in its clamped relation to said supporting portion.

These and various other objects, the invention attains by the construction hereinafter described and illustrated in the accompanying drawings, wherein:—

Fig. 1 is a rear view of a motor vehicle showing a spare tire mounted thereupon, and safeguarded in accordance with the present invention.

Fig. 2 is a side view of the rear portion of the vehicle, similarly showing the invention applied thereto.

Fig. 3 is a plan view of the tire protector showing its position of use upon the rear fender guards, and further showing its operative position relative to the spare tire and its carrier.

Fig. 4 is a vertical sectional view taken upon the line 4—4 of Fig. 3 and showing a portion of the clamping and locking means whereby one end of the tire protector is secured.

Fig. 5 is a vertical cross-section taken on line 5—5 of Fig. 3 and further illustrating the clamping means.

Fig. 6 is a vertical cross section taken upon the line 6—6 of Fig. 3 and showing the provision for pivotally mounting the other end of the tire protector upon a fender guard.

Fig. 7 is a fragmentary view in elevation of the clamping and locking means.

Fig. 8 is a sectional view taken upon the line 8—8 of Fig. 6 showing certain details of the pivotal end of the protector.

In these views the reference character 1 designates a motor vehicle body, and 2 an ordinary form of tire carrier mounted upon the rear end of said body and providing a three-point support for a spare tire, such as is indicated at 3. The tire carrier is mounted upon the body 1 by an arm 4 or in any other suitable manner. 5 and 5' designate rear fender guards of a common construction, comprising vertically spaced bars horizontally curved across the rear ends of the fenders and mounted in any suitable manner upon the vehicle body or frame as indicated in Fig. 3.

The present invention comprises a pair of vertically spaced guard bars 7 preferably formed of spring steel which are connected in a unitary relation and which form a unit having one end pivoted by a bolt 8 to one of the fender guards 5 and are adapted at their other ends to be clamped and locked to the other fender guard.

As is best seen in Fig. 6 the pivot bolt 8 passes between the spaced bars 7 and between the spaced bars of the fender guard 5, said bolt being headed at one end as indicated at 9 to engage a plate 10, the ends of which are bent, as indicated at 11, above and below the bars 7 and which is intermediately formed with a pair of lugs 12, projecting between and properly spacing said bars. 13 designates a pair of plates mounted upon said bolt and engaging opposite sides of the fender guard 5, reinforcing the latter. A plate 14 is mounted upon said bolt between the protector 7 and guard 5, and tongues 15 are struck out of said plate and bent to engage between the bars forming said protector. (See Fig. 8.) 16 is a nut threaded upon the forward end of the bolt 8 and permanently secured upon said bolt by a pin 17. At its center and adjacent to its other end, the protector 7 is provided with any suitable clamping means as indicated at 18 and 18' for holding the bars 7 in properly spaced unitary relation.

For clamping the other end of the protector to the fender guard 5', a pin 19, headed against the rear face of the bars 7, is passed between said bars and between those of the guard 5' and forwardly of the latter bars pivotally carries a cam 20 having an integral curved shank 21. Said cam is channeled as indicated at 22 to receive the pin 19 and a rivet 23 eccentrically engaging said cam, passes freely through said pin mounting the cam thereupon. When said cam occupies the position shown in full lines in Fig. 3, the adjacent end of the protector 7 is drawn into firm engagement with the guard 5'. As a provision for locking said cam in the described clamping position, a pin 24 is rigidly mounted upon the guard 5' adjacent to the cam 20 and the shank 21 of said cam is apertured to receive said pin. A transverse opening 25 in the pin 24 is adapted to receive the yoke of a suitable lock 26 whereby the shank may be secured upon said pin.

As exemplifying one way of mounting the pin 24 upon the fender guard 5', said pin may project integrally from a cap nut 27 threaded upon one end of a bolt 28 which is headed as indicated at 29 and which clamps plates 30 against opposite faces of the bars, forming the guard 5', maintaining a properly spaced unitary relation between said bars. Preferably a pin 31 is employed to permanently attach the nut 27 to the bolt 28 so that the lock 26 may not be removed together with said nut.

In the use of the described invention, when the protector 7 is clamped and locked in the horizontal position shown in full lines in Fig. 1, removal of a tire 3 from the carrier 2 is positively prevented by said protector, as is evident from Fig 3, the clearance space between the protector and said tire will not afford the latter the necessary rearward play to permit its disengagement from the carrier. Furthermore, in said position of the protector, the bars 7 will ordinarily take such shocks and jars arising from rear end collisions as might otherwise be imparted to the tire 3, causing damage to the latter.

Authorized removal of the tire 3 may be readily accomplished by first removing the lock 26, then swinging the cam 20 to release its shank from the pin 24 and at the same time relieve the clamping stress imposed by said cam, then shifting said cam together with its supporting pin 19 lengthwise of the protector 7 to the position clear of said protector, shown in dash lines in Fig. 3. The protector is then free to be swung to the raised position shown in dash lines in Fig. 1, or to any other position that will not interfere with the removal of the tire.

From the preceding description, it will appear that the described invention protects a spare tire both from theft and from damage in the event of a rear end collision, and it will further appear that said protector has the nature of a simple attachment readily applicable to any vehicle equipped with rear fender guards, and which may be made applicable to any other vehicle by providing such guards for the same.

What I claim is:—

1. In a spare tire protector, the combination with a vehicle and a carrier for a spare tire mounted upon said vehicle, of an elongated protector for a tire upon said carrier, means pivoting said protector upon said vehicle at one side of said carrier to swing in a substantially vertical plane transverse of the vehicle, and means for locking the other end portion of said protector to the vehicle at the other side of said carrier.

2. In a spare tire protector, the combination with a vehicle and a carrier thereupon for a spare tire, of an elongated protector for a tire on said carrier, pivoted upon said vehicle at one side of said carrier, means for clamping said protector to the vehicle at the other side of the carrier, and means for locking the protector in its clamped relation to the vehicle.

3. In a spare tire protector, the combination with a vehicle, and a carrier on said vehicle for a spare tire, of an elongated protector for a tire upon said carrier, means pivoting one end portion of said protector to the vehicle at one side of the carrier, a pin for detachably connecting the other end portion of the protector to the vehicle, a cam pivoted upon said pin and adapted in one position to clamp the protector firmly to the vehicle, means for locking said cam in its clamping position.

4. In a spare tire protector, the combination with a vehicle and a carrier upon said vehicle, for a spare tire, of a pair of rear fender guards carried by the vehicle, one at each side of the tire carrier, an elongated protector for a spare tire upon said carrier, means pivotally connecting said protector to one of said guards, a pin connecting said protector to the other guard slidable lengthwise of said guard and protector to disengage the protector, means carried by said pin for clamping the protector firmly to the guard, and a common means carried by the guard for restraining said pin from longitudinal shifting, and for maintaining said clamping means in clamping position.

5. In a spare tire protector, the combination with a vehicle and a carrier for a spare tire upon said vehicle, of a pair of rear fender guards mounted upon said vehicle one at each side of said tire carrier, means pivotally securing said protector to one of said guards, a pin for connecting said protector to the other guard slidable lengthwise of said guard to disengage the protector, a cam member carried by said pin for clamping the protector firmly to the guard, a shank rigidly projecting from said cam, and means carried by said guard engageable with said shank to lock the latter in clamping position, and to hold said pin against sliding movement.

6. In a spare tire protector, the combination with a vehicle and a carrier upon said vehicle for a spare tire, of a pair of rear fender guards carried by the vehicle, one at each side of said tire carrier, an elongated protector for a spare tire upon said carrier, means pivotally connecting said protector to one of said guards, and a locking element carried by the other guard and normally engaging said protector and slidable upon said guard to disengage said protector.

7. In a spare tire protector, the combination with a vehicle and a carrier upon said vehicle for a spare tire, of a pair of rear fender guards carried by the vehicle, one at each side of said tire carrier, an elongated protector for a spare tire upon said carrier, means pivotally connecting said protector to one of said guards, the other of said guards and the protector being formed with normally registering elongated openings, and a lock element normally engaging in both of said openings to secure the end of the protector remote from its pivot to the adjacent guard, said element being slidable in said guard opening to disengage it from the protector opening.

8. In spare tire protector, the combination with a vehicle, and a carrier upon said vehicle, for a spare tire, of a pair of rear fender guards carried by the vehicle, one at each side of said tire carrier, an elongated protector for a spare tire upon said carrier, means pivotally connecting said protector to one of said guards, an element slidable upon the other of said guards to engage and disengage the free end of said protector, and means carried by said guard for locking said sliding element in its position of engagement with the protector.

In testimony whereof I sign this specification.

BERNARD H. GERKER.